(12) United States Patent
Fowler et al.

(10) Patent No.: US 11,124,123 B2
(45) Date of Patent: Sep. 21, 2021

(54) VEHICLE STORAGE COMPARTMENT

(71) Applicant: Ford Global Technologies, LLC, Dearborn, MI (US)

(72) Inventors: James Hugh Fowler, Novi, MI (US); Luis Javier Benavides, Troy, MI (US); Kevin Mozurkewich, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/151,731

(22) Filed: Oct. 4, 2018

(65) Prior Publication Data
US 2020/0108776 A1    Apr. 9, 2020

(51) Int. Cl.
*B60R 5/02*    (2006.01)

(52) U.S. Cl.
CPC ..................... *B60R 5/02* (2013.01)

(58) Field of Classification Search
CPC .... B60R 5/02; B60R 5/00; B60R 7/04; B60R 5/045; B60R 5/04; B60R 7/043; B60N 2/36; B60Q 3/80; B60Q 3/30; B60Q 3/225
USPC ................... 296/24.44, 37.14, 37.15, 37.16
See application file for complete search history.

(56) References Cited

U.S. PATENT DOCUMENTS

| | | | |
|---|---|---|---|
| 5,039,155 A | 8/1991 | Suman et al. | |
| 5,269,229 A * | 12/1993 | Akapatangkul | B60N 3/004 100/47 |
| 6,237,981 B1 | 5/2001 | Seeleck | |
| 7,963,231 B2 * | 6/2011 | Osborne | B64D 11/0638 108/40 |
| 8,573,670 B2 | 11/2013 | Zekavica et al. | |
| 2015/0001875 A1 * | 1/2015 | Giorgis | B60R 5/045 296/37.16 |
| 2018/0134222 A1 | 5/2018 | Schmidt et al. | |

* cited by examiner

*Primary Examiner* — Stephen T Gordon
(74) *Attorney, Agent, or Firm* — David Coppiellie; Price Heneveld LLP (57) ABSTRACT

A vehicle storage compartment is provided herein. The vehicle storage compartment includes first and second vertical members coupled to a first edge portion of a base and connected by a cross member. The first and second vertical members and the cross member define an aperture accessible from a vehicle-rearward location. The vehicle storage compartment includes a removable floor positioned on base.

17 Claims, 9 Drawing Sheets

VEHICLE STORAGE COMPARTMENT

FIELD OF THE DISCLOSURE

The present disclosure generally relates to a storage compartment, and more particularly, to a vehicle storage compartment.

BACKGROUND OF THE DISCLOSURE

Interior vehicle storage compartments offer occupants of a vehicle space to store luggage and other personal items. It is therefore desired to implement such structures in automotive vehicles for increased storage capabilities within the vehicle.

SUMMARY OF THE DISCLOSURE

According to a first aspect of the present disclosure, a vehicle storage compartment is disclosed. The vehicle storage compartment includes first and second vertical members coupled to a first edge portion of a base. The vehicle storage compartment further includes a cross member interconnecting the first and second vertical members. An aperture is defined by the first and second vertical members and the cross member and accessible from a vehicle-rearward location. Additionally, the vehicle storage compartment includes a removable floor positioned on a base.

Embodiments of the first aspect of the disclosure can include any one or a combination of the following features:
- a first panel pivotally coupled to the first and second vertical members and retained to the cross member in a stowed position;
- a second panel pivotally coupled to the first panel such that the first and second panels form a single surface that is substantially continuous and extends in a vehicle-rearward direction from the first and second vertical members;
- a retaining member coupled to the first edge portion of the base, wherein the retaining member extends above a top surface of the base;
- a first wall coupled to a second edge portion of the base and extending vertically upward therefrom and a light source coupled to the first wall;
- a plurality of raised portions extending from a surface of the removable floor, such that the removable floor includes a first thickness and a second thickness; and
- a sensor configured to sense the presence of items positioned on the base and communicate a signal to a controller indicating the sensed presence.

According to a second aspect of the present disclosure, a vehicle is disclosed. The vehicle includes a floor and further includes a base coupled to the floor and having first and second vertical members extending from the base. The first and second vertical members are coupled to a cross member. Additionally, the vehicle includes a first panel pivotally coupled to top portions of the first and second vertical members, respectively.

Embodiments of the second aspect of the disclosure can include any one or a combination of the following features:
- the first and second vertical members and the cross member define an aperture accessible to a vehicle-rearward row of seats within the vehicle;
- first and second walls coupled to the base, wherein the first wall is coupled to a vehicle-forward edge portion of the base and the second wall is coupled to a lateral edge portion of the base;
- a light source coupled to at least one of the first wall and the second wall;
- a second panel pivotally coupled to the first panel such that the first and second panels form a single surface that is substantially continuous and extends in a vehicle-rearward direction from the first and second vertical members;
- a retaining member coupled to a vehicle-rearward edge portion of the base, wherein the retaining member extends above a top surface of the base; and
- a removable floor positioned on the base and having a plurality of raised ribs extending from a portion of a surface of the removable floor, such that the removable floor includes a first thickness and a second thickness.

According to a third aspect of the present disclosure, a vehicle is disclosed. The vehicle includes a base coupled to first and second walls and a removable floor. Additionally, the vehicle includes first and second vertical members extending from the base and coupled to a cross member to define an aperture.

Embodiments of the third aspect of the disclosure can include any one or a combination of the following features:
- the first and second walls are coupled to adjoining first and second edge portions of the base;
- the base is positioned in a front passenger area of the vehicle and is simultaneously accessible from a location that is external to the vehicle and vehicle-rearward row of seats;
- a folding tray that includes a first panel pivotally coupled to a second panel, wherein the first panel is coupled to the first and second vertical members at an end that is opposite the second panel;
- a sensor configured to sense the presence of items positioned on the base and communicate a signal to a controller indicating the sensed presence; and
- the removable floor includes a plurality of raised portions extending from a surface of the removable floor.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
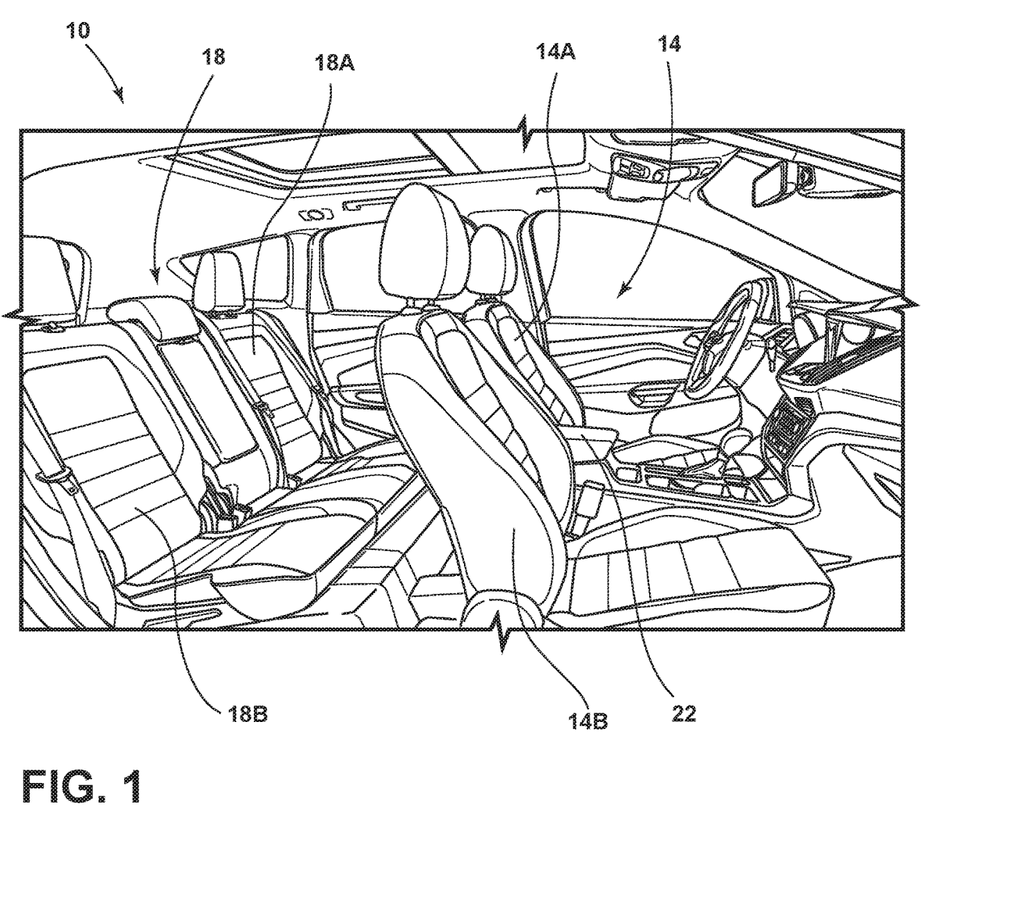
FIG. 1 is a side perspective view of an interior of a vehicle, according to some aspects of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-9, reference numeral 10 generally designates a vehicle. The vehicle 10 may have a first row of seats 14 and a second row of seats 18 rearward of the first row of seats 14. The first and second row of seats 14, 18 may include a first seat 14A, 18A disposed on a driver-side of the vehicle 10 and a second seat 14B, 18B disposed on a passenger-side of the vehicle 10, respectively. The vehicle 10 may have a console 22 positioned between the first and second seats 14A, 14B of the first row of seats 14.

Referring again to FIGS. 1-9, a storage compartment 26 may be positioned within the vehicle 10. The storage compartment 26 may include first and second vertical members 30, 34 coupled to a vehicle-rearward edge portion 38 of a base 42. The first and second vertical members 30, 34 may be connected by a cross member 46. The first and second vertical members 30, 34 and the cross member 46 may cooperate to define an aperture 50 accessible from a vehicle-rearward direction. The storage compartment 26 may include a removable floor 54 positioned on the base 42.

Figure 2:
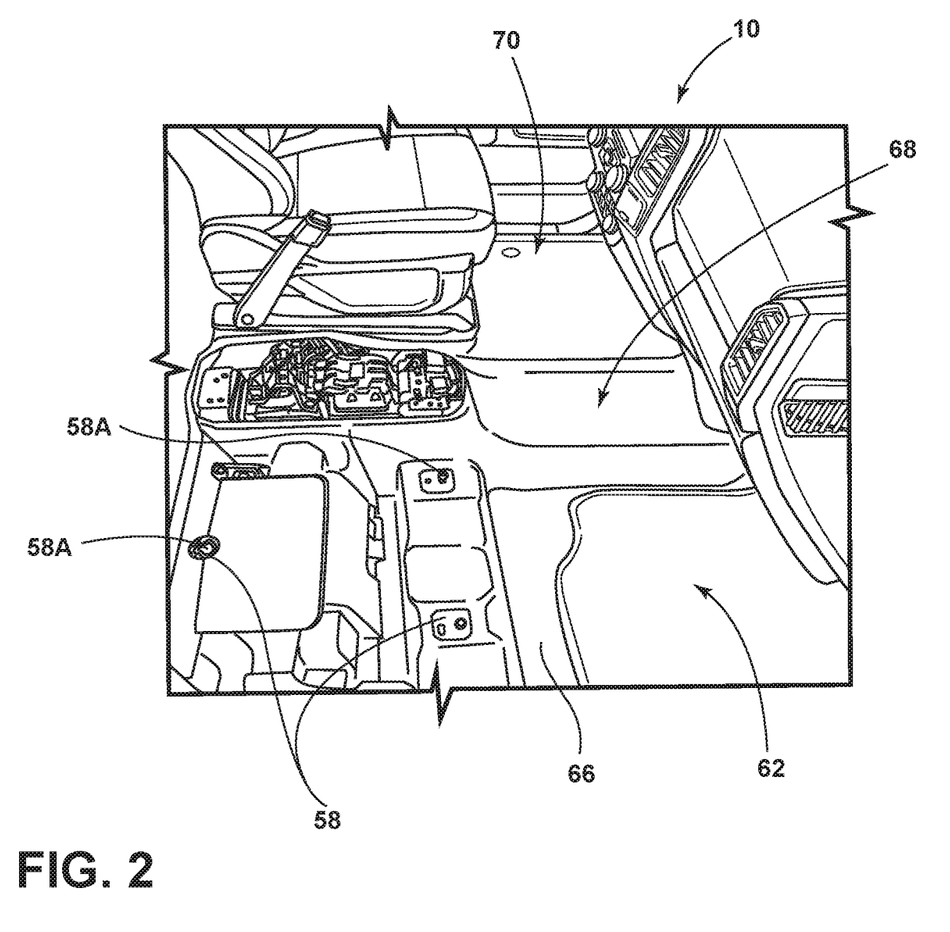
FIG. 2 is a top perspective view of the interior of the vehicle, illustrating a center console and front passenger seat removed from the interior, according to some aspects of the present disclosure.

Referring now to FIG. 2, in various embodiments, the second seat 14B of the first row of seats 14 and the console 22 may be removed from the vehicle 10. When the second seat 14B is removed from a front passenger area 62, a floor 66 of the vehicle 10 is exposed having a plurality of differing elevations. For example, a vehicle-forward portion of the floor 66 has a lower elevation than a vehicle-rearward portion of the floor 66 in the front passenger area 62. Similarly, a middle portion positioned between the vehicle-forward and vehicle-reward portions of the floor 66 has a lower elevation than the vehicle-rearward portion but a higher elevation than the vehicle-forward portion of the floor 66. Further, the middle portion has lateral plateaus that define a lower valley therebetween. An area between the front passenger area 62 and a front driver-side area 70 has an additional different elevation than the floor 66 in the front passenger area 62. A console area 68 positioned between the front passenger area 62 and the front driver-side area 70 may have further additional elevations. When the console 22 is removed, a vehicle-rearward portion of the console area 68 can have an elevation higher than the elevation of the vehicle-rearward portion of the front passenger area 62. Additionally, a vehicle-forward portion of the console area 68 has an elevation that is lower than the vehicle-rearward portion of the console area 68 but higher than the elevation of the vehicle-forward portion of the front passenger area 62. In various embodiments, the front passenger area 62 and the console area 68 can include at least five different elevations when the second seat 14B of the first set of seats 14 and the console 22 are removed. Additionally, when the second seat 14B is removed a variety of floor features may be exposed that assist with reinforcing a conventional seating assembly and/or with positioning the seating assembly at a desired height within the vehicle 10. The floor 66 in the front passenger area 62 may define one or more apertures 58 configured to receive one or more fasteners 58A. The fasteners 58A may extend vertically from the floor 66 of the vehicle 10 such that the storage compartment 26 can engage with the fasteners 58A. Alternatively, the fasteners 58A may extend from the storage compartment 26 and engage with the apertures 58.

Figure 3:
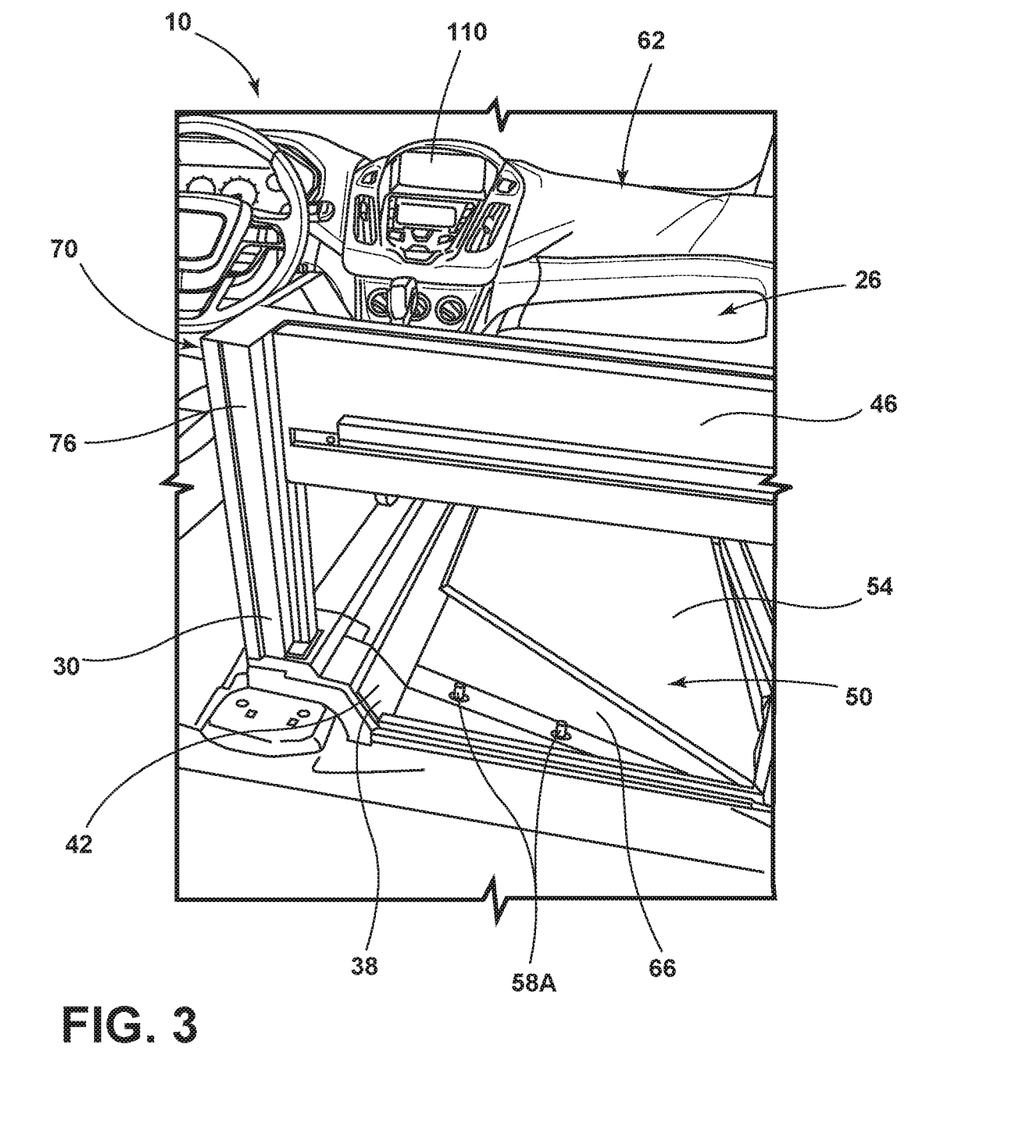
FIG. 3 is a rear perspective view of a vehicle storage compartment positioned in a front passenger area of the vehicle, according to some aspects of the present disclosure.

Referring to FIG. 3, the storage compartment 26 can be positioned within the front passenger area 62 of the vehicle 10. The storage compartment 26 can provide additional storage space and assist with the placement and/or organization of items within the storage compartment 26. The base 42 of the storage compartment 26 can be contoured to the uneven floor 66 of the front passenger area 62 such that the base 42 is provided with one or more protrusions 72 (FIG. 6) extending from a bottom surface 74 (FIG. 6) of the base 42. It will be understood that the storage compartment 26 may be positioned in alternative areas of the vehicle 10 without departing from the concepts disclosed herein. In some embodiments, the storage compartment 26 may be positioned in the second row of seats 18 (FIG. 1). In other embodiments, the storage compartment 26 may be positioned in the front driver-side area 70 when the storage compartment 26 is installed, for example, in autonomous vehicles. Alternatively, the storage compartment 26 may be utilized within the vehicle 10 without removing any of the first seats 14A, 18A and/or second seats 14B, 18B. In various embodiments, the base 42 may be coupled to the floor 66 of the vehicle 10 by the fasteners 58A used to couple the second seat 14B and/or console 22 (FIG. 1) to the floor 66. It may be advantageous to utilize the same fasteners 58A to couple both the second seat 14B and the base 42 to the floor 66 to allow the second seat 14B and the storage compartment 26 to be more easily interchangeable within the vehicle 10. In other embodiments, the base 42 may be coupled to the floor 66 by other attachments such as, for example, a latch and striker, quarter turn couplers, and/or rails. The removable floor 54 may be positioned on the base 42 such that the removable floor 54 is positioned over the fasteners 58A to prevent visibility of the fasteners 58A by an occupant. Additionally, having the removable floor 54 positioned over the fasteners 58A can prevent occupants from adjusting the positioning of the storage compartment 26 when the removable floor 54 is positioned on the base 42.

Referring again to FIG. 3, the storage compartment 26 may include the first and second vertical members 30, 34 (FIG. 5) coupled to the vehicle-rearward edge portion 38 of the base 42. In some embodiments, the first and second vertical members 30, 34 may be separate elements coupled to the base 42. Alternatively, the first and second vertical members 30, 34 may be integrally formed with the base 42 and extend vertically therefrom. The cross member 46 can be connected to the first and second vertical members 30, 34. In some embodiments, the cross member 46 may be coupled to top portions 76, 78 (FIG. 5) of the first and second vertical members 30, 34, respectively. In other embodiments, the cross member 46 and the first and second vertical members 30, 34 may form a single element. The first and second vertical members 30, 34 and the cross member 46 may define the aperture 50 that is accessible from a vehicle-rearward location. Regardless of the positioning of the cross member 46, the cross member 46 can assist in retaining luggage or other items within the storage compartment 26. In some embodiments, the cross member 46, the first vertical member 30, and/or the second vertical member 34 may be positioned such that the storage compartment 26 is configured, for example, to retain luggage having dimensions of about 22 inches by 14 inches by 9 inches (e.g., conventional carry-on-sized luggage). Alternatively, the cross member 46 can be positioned on the first and second vertical members 30, 34 at a height sufficient to retain, for example, groceries and other smaller personal items. The cross member 46 can be configured to couple to a variety of locations along the first and second vertical members 30, 34. The storage compartment 26 may be formed from a variety of materials such as, for example, metal, metal alloy, plastic, rubber, acrylic, plexiglass, polypropylene, and/or polycarbonate. Alternatively, the storage compartment 26 can be formed from a lightweight, strong, and rigid material such as, for example, carbon fiber, aluminum, and/or steel. Additionally, different components of the storage compartment 26 may be formed from different materials (e.g. the cross member 46 formed from rubber and the base 42 formed from plastic). The storage compartment 26 can be made by injection molding. Alternatively, the storage compartment 26 can be formed by tubular components molded and/or welded together.

Figure 4:
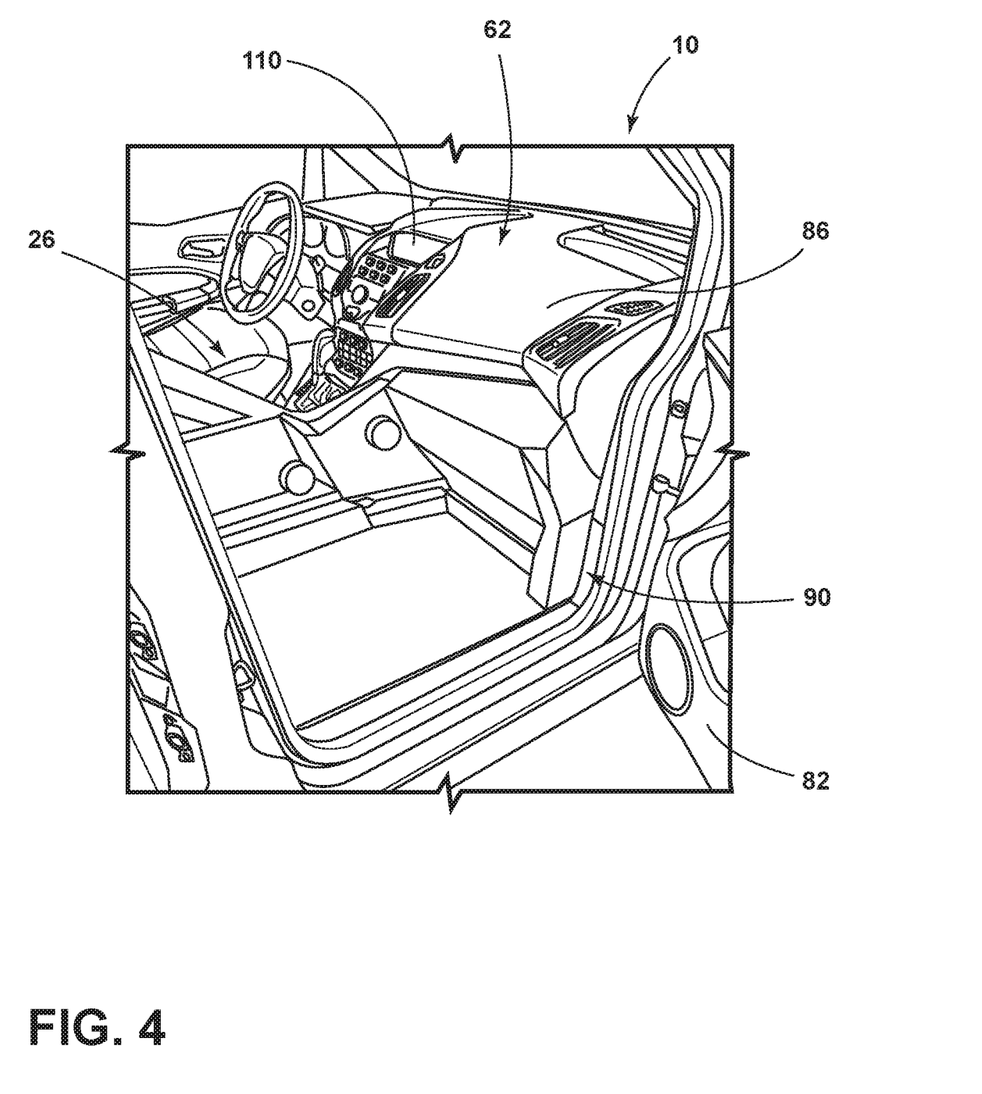
FIG. 4 is a side perspective view of the vehicle storage compartment positioned in the front passenger area of the vehicle, according to some aspects of the present disclosure.

Referring to FIG. 4, the storage compartment 26 may be accessible from a location external the vehicle 10 and/or from vehicle-rearward row of seats such as, for example, the second row of seats 18 (FIG. 1). The storage compartment 26 may be accessible simultaneously from the vehicle-rearward location and the external location. In some embodiments, the location that is external to the vehicle 10 may be located proximate the passenger-side when a passenger-side door 82 is open. In various embodiments, the storage compartment 26 may extend under a portion of a dashboard 86 in the front passenger area 62 of the vehicle 10. A vehicle-forward portion 90 of the storage compartment 26 may be configured to allow the storage compartment 26 to be positioned proximate the dashboard 86. In some embodiments, the vehicle-forward portion 90 of the storage compartment 26 may be configured to prevent interference with access to a compartment within the dashboard 86 (e.g., a glove compartment or storage compartment). Additionally, the storage compartment 26 can have a length in the fore-aft direction that can allow a rearward passenger to sit immediate behind the storage compartment 26. Alternatively, the storage compartment 26 can have a length in the fore-aft direction such that a passenger cannot sit immediately behind the storage compartment 26.

Figure 5:
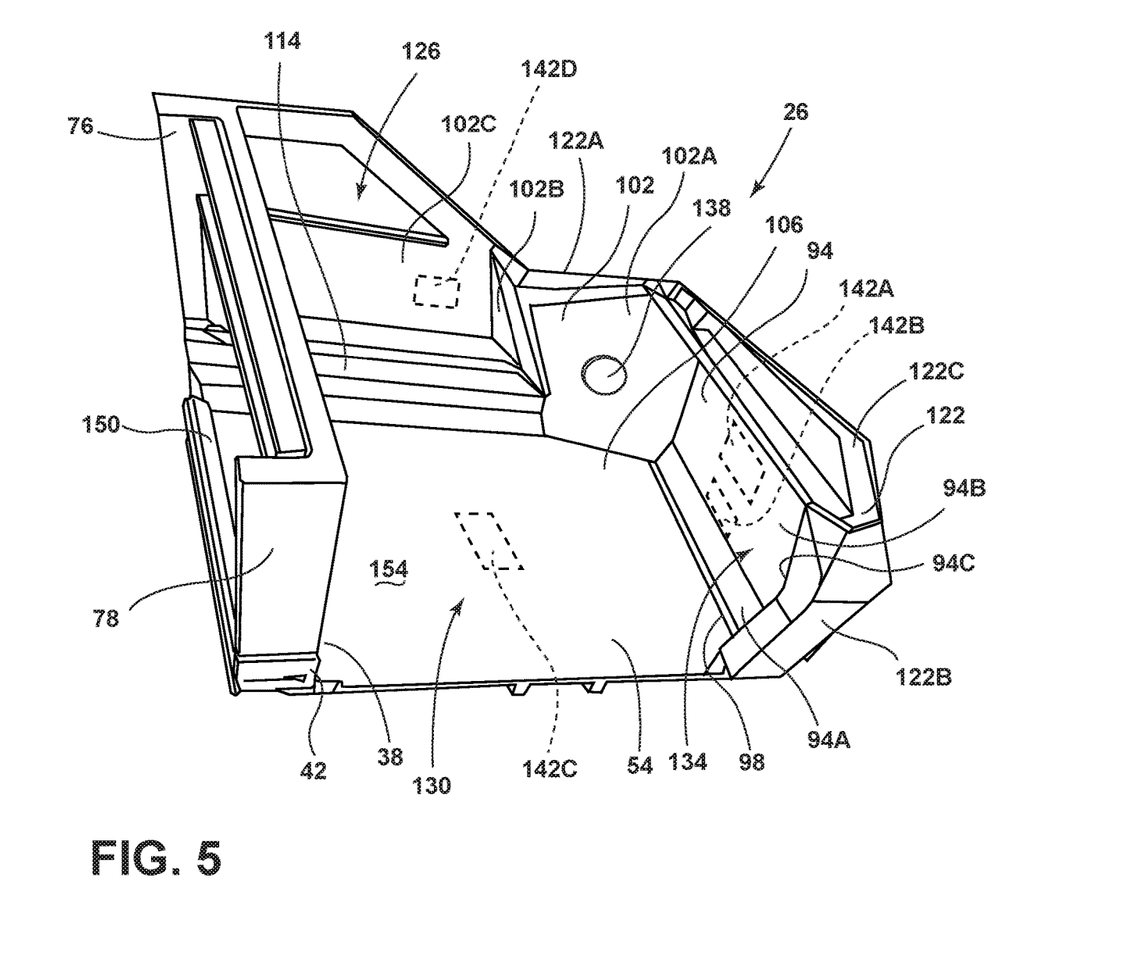
FIG. 5 is a side perspective view of the vehicle storage compartment, according to some aspects of the present disclosure.

Referring to FIG. 5, a first wall 94 may be coupled to a vehicle-forward edge portion 98 of the base 42 and extend vertically therefrom. In various embodiments, the first wall 94 may be integrally formed with the base 42. The first wall 94 may include a bottom portion 94A that extends at an angle from the base 42 and a top portion 94B that extends substantially vertically from the bottom portion 94A. The angle can be an obtuse angle such as, for example, in the range of about 90° to about 180° and/or any intermediate value therebetween. It may be advantageous to include the bottom portion 94A of the first wall 94 extending at an obtuse angle from the base 42 to assist in positioning the storage compartment 26 proximate and/or under a portion of the dashboard 86 (FIG. 4) while preventing cargo items from becoming lodged and/or lost during vehicle maneuvers. The storage compartment 26 may include a second wall 102 coupled to a lateral edge portion 106 of the base 42 and extending vertically therefrom. The first wall 94 and the second wall 102 may be coupled to adjoining edge portions of the base 42. In various embodiments, the lateral edge portion 106 may be proximate the first seat 14A of the first row of seats 14 (FIG. 4). The second wall 102 may include a vehicle-forward portion 102A, a middle portion 102B, and a vehicle-rearward portion 102C. The vehicle-forward portion 102A may be coupled to the first wall 94 and extend in a vehicle-rearward direction therefrom. The middle portion 102B may be coupled to the vehicle-forward portion 102A and extend at an angle from the vehicle-forward portion 102A towards the driver-side area 70 (FIG. 2). The angle can be an obtuse angle, for example, an angle in the range of about 180° to about 360° and/or any intermediate value therebetween. The middle portion 102B may be coupled to the vehicle-rearward portion 102C of the second wall 102. The vehicle-rearward portion 102C can extend in a vehicle-rearward direction from the middle portion 102B and be positioned a greater lateral distance from the base 42 when compared to the vehicle-forward portion 102A. It may be advantageous to have the vehicle-forward and vehicle-rearward portions 102A, 102C of the second wall 102 be positioned at different distances from the base 42 to assist in coupling the base 42 to the floor 66 (FIG. 2) of the vehicle 10 without interfering with a user interface 110 (FIG. 3) proximate the dashboard 86.

Referring again to FIG. 5, a platform 114 may be positioned between the vehicle-rearward portion 102C of the second wall 102 and the base 42. In various embodiments, the storage compartment 26 may have a width in the latitudinal direction such that the base 42 can be coupled to the front passenger area 62 (FIG. 2) and the platform 114 can be coupled to the console area 68 (FIG. 2) of the vehicle 10. In some examples, the storage compartment 26 can include a frame 122. The frame 122 may include first and second lateral portions 122A, 122B and a vehicle-forward portion 122C. The first lateral portion 122A may be positioned on the storage compartment 26 proximate the first seat 14A. The first lateral portion 122A may be coupled to the top portion 76 of the first vertical member 30 and extend horizontally therefrom in a vehicle-forward direction. In some embodiments, the first lateral portion 122A of the frame 122 may extend from the first vertical member 30 in a substantially horizontal direction and then decline at an angle to be coupled to the middle portion 102B of the second wall 102. The first lateral portion 122A may extend over, and cooperate with, the vehicle-rearward portion 102C of the second wall 102 to define an aperture 126 that is accessible from the first seat 14A (FIG. 4). In various embodiments, the first lateral portion 122A may also extend over the middle and vehicle-forward portions 102B, 102A of the second wall 102. Additionally, the first lateral portion 122A may extend toward the base 42 between the middle and vehicle-forward portions 102B, 102A of the second wall 102 and terminate proximate the platform 114.

Referring further to FIG. 5, the second lateral portion 122B may be coupled to the first wall 94 and the base 42 proximate the passenger-side door 82 (FIG. 4). In various embodiments, the second lateral portion 122B may be coupled to a lateral edge portion 94C of the first wall 94 and extend horizontally therefrom in a vehicle-rearward direction. In some embodiments, the second lateral portion 122B may extend horizontally from the first wall 94 and then at an angle towards an interior 130 of the storage compartment 26. In various embodiments, the frame 122 may include a vehicle-forward portion 122C coupled to the top portion 94B of the first wall 94. The vehicle-forward portion 122C may be advantageous in positioning the storage compartment 26 proximate and/or under a portion of the dashboard 86 (FIG. 4) to provide more storage space while preventing cargo items from becoming lodged or lost during vehicle maneuvers. The vehicle-forward portion 122C may extend in a vehicle-rearward direction such that the vehicle-forward portion 122C cooperates with the second lateral portion 122B of the frame 122 and the vehicle-forward portion 102A of the second wall 102 to define a cavity 134. The vehicle-forward portion 90 of the storage compartment 26 may be configured to not include a substantially horizontal and flat top surface to prevent occupants from stacking luggage and/or other items in a manner that would hinder occupant visibility and/or interfere with safety features (e.g., airbag deployment). Additionally, it may be advantageous for the storage compartment 26 to have an open top portion (e.g. no top surface) such that visibility of the interior 130 of the storage compartment 26 can be substantially unobstructed from occupants within the vehicle 10. Further, the passenger-side door 82 can act as a wall for the storage compartment 26 when the passenger-side door 82 is in a closed position. It may be advantageous for the passenger-side door 82 to act as a wall of the storage compartment 26 such that an additional wall member does not need to be attached, thereby reducing production time and costs.

Referring further still to FIG. 5, a light source 138 may be coupled to at least one of the first and second walls 94, 102. In some embodiments, the light source 138 may be configured to illuminate in low-light conditions. In other embodiments, the light source 138 may be configured to illuminate in response to, for example, an opening of an exterior door of the vehicle 10 (FIG. 4). Alternatively, the light source 138 may be operably coupled to a controller 146 (FIG. 9) such that the light source 138 can indicate to an occupant (e.g., flash) if items remain within the storage compartment 26. The light source 138 may include one or more light sources and may include one or more types of light sources. For example, the light source 138 may be, but is not limited to, fluorescent lighting, light emitting diodes (LEDs), organic LEDs (OLEDs), polymer LEDs (PLEDs), and/or solid-state lighting. According to some embodiments, one or more light sources 138 may be configured to emit a wavelength of light that can be characterized as visible light (about 380-700 nanometers) and/or white light (about 390-700 nanometers) to take advantage of the relative low cost attributable to those types of LEDs.

Referring yet again to FIG. 5, a sensor 142 may be coupled to one of the first and second walls 94, 102, the base 42, and/or the removable floor 54. The sensor 142 may be configured to sense the presence of items positioned on the base 42 and communicate a signal to the controller 146 (FIG. 9) such that the controller 146 can subsequently indicate the presence of the item to occupants of the vehicle 10. The sensor 142 may include, for example, an optical sensor 142A, an infrared sensor 142B, a force sensor 142C, and/or a video image sensor 142D. In some embodiments, the force sensor 142C may be coupled to the removable floor 54 and configured to sense when an object is positioned on the removable floor 54. Alternatively, the force sensor 142C can be coupled to the base 42 and positioned beneath the removable floor 54 to sense a force imparted on the removable floor 54 by the object(s) stored on the removable floor 54. The force sensor 142C may be configured to send a signal to the controller 146 (FIG. 9) when a weight exceeds a predetermined threshold such that the force sensor 142C can differentiate between items positioned on the removable floor 54 and the weight of the removable floor 54. Additionally, the optical sensor 142A and/or the infrared sensor 142B may be configured to send signals to the controller 146 (FIG. 9) when an item is positioned in a predetermined location such that the optical sensor 142A and/or the infrared sensor 142B can differentiate between items within the storage compartment 26 and the storage compartment 26 itself. Further, the optical sensor 142A can be positioned within the storage compartment 26 and/or other locations within the vehicle 10 and may be configured to take images of the interior 130 of the storage compartment 26 upon departure and/or arrival at a location. The optical sensor 142A may cooperate with the controller 146 (FIG. 9) to compare images from an initial departure of the vehicle 10 and an arrival to sense if an item remained within the storage compartment 26. The storage compartment 26 can be a variety of colors; for example, the removable floor 54 may be a dark color (e.g., black) and the first and second walls 94, 102 may be a lighter color compared to the removable floor 54 (e.g., grey and/or white) to provide contrast more readily detectable by the optical sensor 142A and/or infrared sensor 142B. The video image sensor 142D may be positioned within the storage compartment 26 and/or in an alternate location within the vehicle 10. Additionally, the video image sensor 142D may be operably coupled to a video monitoring system to provide for video surveillance of the storage compartment 26.

Referring further still to FIG. 5, a retaining member 150 may be coupled to the vehicle-rearward edge portion 38 of the base 42. In various embodiments, the retaining member 150 extends above a top surface 154 of the removable floor 54. The retaining member 150 may be configured to assist in preventing small items and/or liquids within the interior 130 of the storage compartment 26 from moving in a vehicle-rearward direction outside of the storage compartment 26. In some embodiments, the retaining member 150 may be integrally formed in the base 42 such that the vehicle-rearward edge portion 38 of the base 42 extends vertically at an angle to a height above the top surface 154 of the removable floor 54. For example, the vehicle-rearward edge portion 38 of the base 42 can extend vertically at an obtuse angle relative to the base 42 such as, for example, in the range of about 90° to about 180° and/or any intermediate value therebetween.

Figure 6:
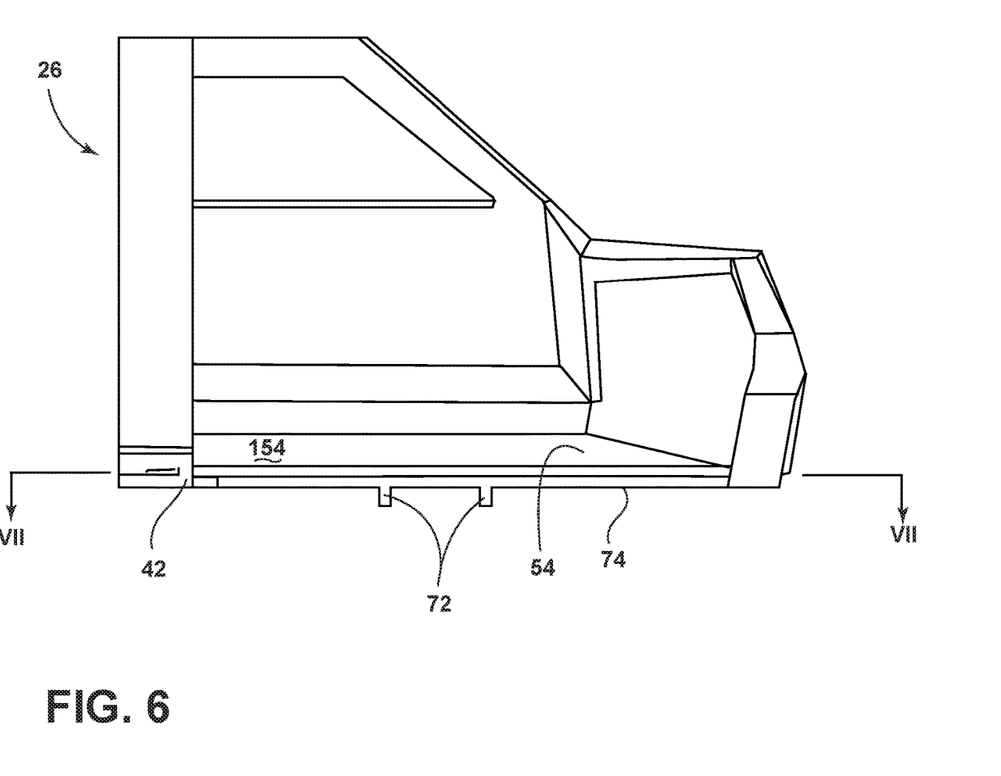
FIG. 6 is a side view of the vehicle storage compartment, according to some aspects of the present disclosure.

Referring now to FIG. 6, the base 42 may include the one or more protrusions 72 extending vertically downward therefrom. In various embodiments, when the second seat 14B is removed from the vehicle 10, the floor 66 is uneven (FIG. 2) and the protrusions 72 may be configured to allow the base 42 to be level when positioned within the vehicle 10. The protrusions 72 can engage with the floor 66 (FIG. 2) of the vehicle 10. Additionally, the protrusions 72 can be positioned proximate the middle portion of the front passenger area 62 where the floor 66 is uneven. Alternatively, the protrusions 72 may be positioned on the base 42 such that the protrusions 72 extend to the vehicle-forward portion of the floor 66, allowing the base 42 to be positioned on the protrusions 72 and the vehicle-rearward portion of the floor 66. Additionally, the protrusions 72 can extend a length substantially similar to a height of the plateaus in the middle portion of the floor 66 of the front passenger area 62, allowing the protrusions 72 to be positioned on the floor 66 and provide the removable floor 54 to be substantially level. The top surface 154 of the removable floor 54 may be substantially linear. The removable floor 54 may be configured to be coupled to the base 42 after the base 42 has been coupled to the floor 66 of the vehicle 10 (FIG. 4). In various embodiments, the floor 66 may be formed from a durable material that is water-resistant. It may be advantageous for the storage compartment 26 to have a water-resistant and washable removable floor 54 to make cleaning the removable floor 54 easier. In some embodiments, the removable floor 54 may be self-draining of liquids thereon.

Figure 7:
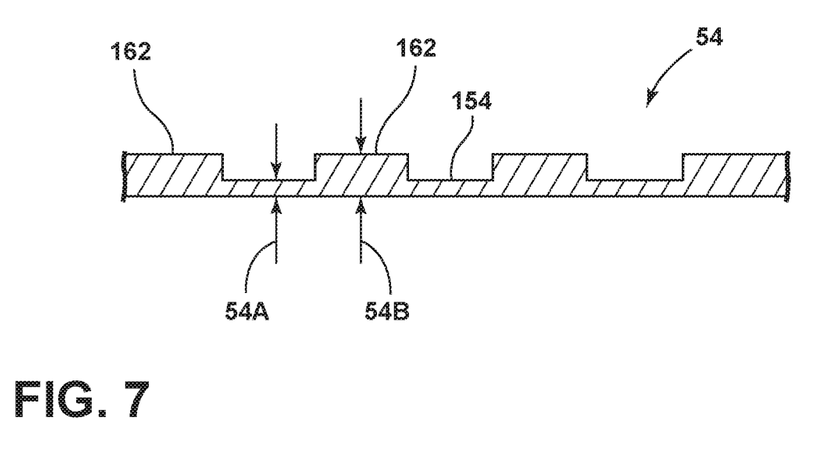
FIG. 7 is a cross-sectional view of a removable floor of the vehicle storage compartment taken at line VII-VII of FIG. 6, illustrating a first thickness and a second thickness, according to some aspects of the present disclosure.

Referring to FIG. 7, the removable floor 54 can include a plurality of raised portions 162 extending from the top surface 154 of the removable floor 54, such that the removable floor 54 has a first thickness 54A and a second thickness 54B. The plurality of raised portions 162 may be configured to assist in collecting moisture and/or liquids and preventing items positioned within the storage compartment 26 from resting in a pool of moisture and/or liquids. In some embodiments, the plurality of raised portions 162 may have substantially linear top surfaces. Additionally, first thickness 54A and second thickness 54B of the removable floor 54 can be configured to assist with draining liquids from the storage compartment 26. The plurality of raised portions 162 may be plateaus that extend vertically from the top surface 154 of the removable floor 54 on each side of the plateau with a substantially linear top surface therebetween. In other embodiments, the plurality of raised portions 162 may be, for example, ribs or corrugations that have top surfaces that continually change in height. Alternatively, the removable floor 54 can have a substantially nonlinear top surface 154 that does not define a uniform pattern of raised portions 162. It may be advantageous to include the plurality of raised portions 162 extending from the removable floor 54 to prevent items within the storage compartment 26 from shifting during vehicle maneuvers.

Figure 8A:
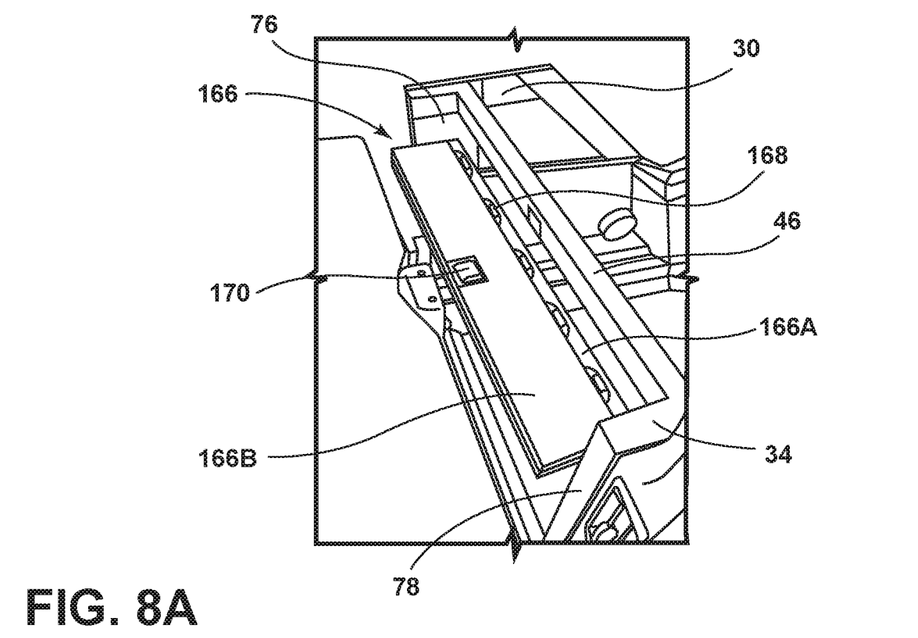
FIG. 8A is a side perspective view of a panel coupled to the vehicle storage compartment, according to some aspects of the present disclosure.
Figure 8B:
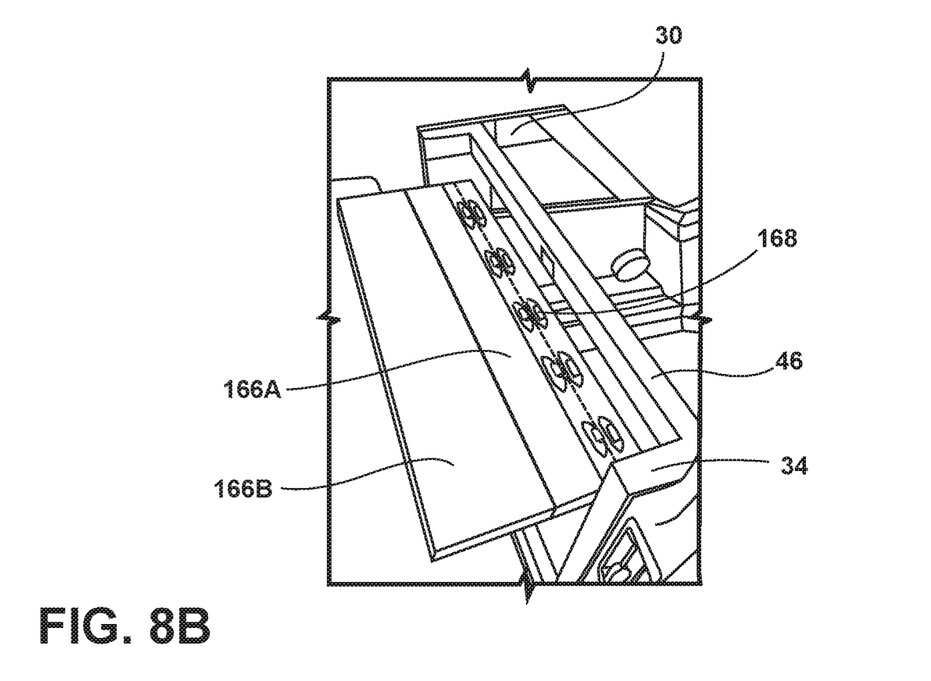
FIG. 8B is a perspective side view of the panel, illustrating a first panel and a second panel of the folding tray in a deployed position, according to some aspects of the present disclosure.

Referring now to FIGS. 8A and 8B, a folding tray 166 may be coupled to the top portions 76, 78 of the first and second vertical members 30, 34. The folding tray 166 may be a bi-folding tray and include a first panel 166A and a second panel 166B. The first panel 166A may be pivotally coupled to the first and second vertical members 30, 34. The second panel 166B may be pivotally coupled to the first panel 166A at an end that is opposite from where the first panel 166A is coupled to the first and second vertical members 30, 34. A locking assembly 168 may be coupled to the first panel 166A and configured to retain the second panel 166B in a stowed position. The locking assembly 168 may be, for example, an electronic latch, key lock, manual lock, digital lock, and/or smart lock. Additionally, the locking assembly 168 may communicate with the controller 146 (FIG. 9) such that the controller 146 may engage and/or disengage the locking assembly 168. A latch 170 may be coupled to the second panel 166B to retain the folding tray 166 in a stowed position. The stowed position can retain the folding tray 166 in a directly abutting relationship with the cross member 46 (FIG. 5). In various embodiments, the folding tray 166 may be deployable in a vehicle-rearward direction from the first and second vertical members 30, 34. In some embodiments, the folding tray 166 may be configured as a work surface and/or a shelf for a passenger in a vehicle-rearward location without substantially restricting access to the interior 130 of the storage compartment 26. Additionally, the first panel 166A may be pivotally coupled to the second panel 166B such that the first and second panels 166A, 166B form a single surface with a surface area that is substantially continuous. Further, the first and second panels 166A, 166B may be substantially similar in size (e.g., substantially similar surface areas).

Figure 9:
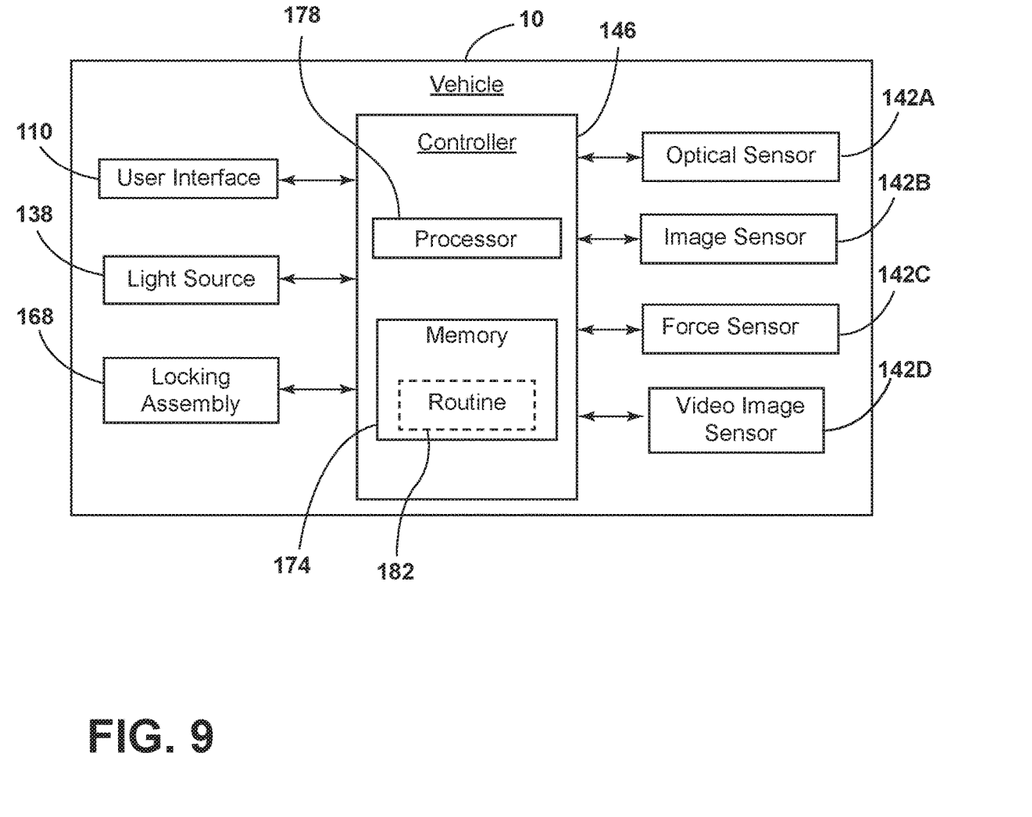
FIG. 9 is a schematic flow diagram of a controller used in the vehicle, according to some aspects of the present disclosure.

Referring to FIG. 9, the controller 146 may include memory 174 and a processor 178. The memory 174 can contain a routine 182 for operation of the controller 146. The processor 178 is coupled to the memory 174 and is configured to execute the routines 182 contained in the memory 174. In various embodiments, the controller 146 may be configured to send and/or receive signals from the optical sensor 142A, the infrared sensor 142B, the force sensor 142C, and/or the video image sensor 142D. In some embodiments, the controller 146 may be configured to send and/or receive signals to the light source 138. Additionally, the controller 146 may be configured to communicate with vehicle components such as, for example, the user interface 110 and/or the light source 138 to convey to an occupant of the vehicle 10 that items have been left in the storage compartment 26. Alternatively, the controller 146 may be configured to send and/or receive signals from the locking assembly 168.

Use of the present disclosure may have a variety of advantages. In a first example, the storage compartment 26 can provide additional storage space while providing a substantially linear floor. In conventional vehicle storage compartments, storage compartments are positioned under the seats where there is an uneven floor, which makes storing items more difficult. Use of the present disclosure can provide an easier location to store items such as, for example, luggage and other personal items by having the substantially flat removable floor 54. In a second example, the storage compartment 26 having the cross member 46 can assist in retaining luggage and other items positioned within the storage compartment. In conventional storage locations within an interior of the vehicle 10, items are often unsecured such that the items may move or become a projectile during vehicle maneuvers. Use of the present disclosure provides the cross member 46 to assist in retaining the items within the storage compartment 26 during such vehicle maneuvers.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is to be understood that variations and modifications can be made on the aforementioned structure without departing from the concepts of the present disclosure, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vehicle, comprising:
   a floor;
   a base coupled to the floor and having first and second vertical members extending from the base, wherein the first and second vertical members are coupled to a cross member;
   a first panel pivotally coupled to top portions of the first and second vertical members, respectively; and
   a removable floor positioned on the base and having a plurality of raised ribs extending from a portion of a surface of the removable floor, such that the removable floor comprises a first thickness and a second thickness.

2. The vehicle of claim 1, wherein the first and second vertical members and the cross member define an aperture accessible to a vehicle-rearward row of seats within the vehicle.

3. The vehicle of claim 2, further comprising:
   first and second walls coupled to the base, wherein the first wall is coupled to a vehicle-forward edge portion of the base and the second wall is coupled to a lateral edge portion of the base.

4. The vehicle of claim 3, further comprising:
   a light source coupled to at least one of the first wall and the second wall.

5. The vehicle of claim 1, further comprising:
   a second panel pivotally coupled to the first panel such that the first and second panels form a single surface that is substantially continuous and extends in a vehicle-rearward direction from the first and second vertical members.

6. The vehicle of claim 1, further comprising:
   a retaining member coupled to a vehicle-rearward edge portion of the base, wherein the retaining member extends above a top surface of the base.

7. A vehicle, comprising:
   a floor;
   a base coupled to the floor and having first and second vertical members extending from the base, wherein the first and second vertical members are coupled to a cross member;
   first and second walls coupled to the base, wherein the first wall is coupled to a vehicle-forward edge portion of the base and the second wall is coupled to a lateral edge portion of the base; and
   a first panel pivotally coupled to top portions of the first and second vertical members, respectively.

8. The vehicle of claim 7, further comprising:
   a second panel pivotally coupled to the first panel to form a folding tray.

9. The vehicle of claim 8, further comprising:
   a locking assembly coupled to the first panel to retain the second panel in a stowed position; and
   a latch coupled to the second panel to retain the folding tray in a stowed position abutting the cross member.

10. The vehicle of claim 7, wherein the first and second vertical members extend from a vehicle-rearward edge portion of the base.

11. The vehicle of claim 7, further comprising:
    a platform positioned between a vehicle-rearward portion of the second wall and the base.

12. A vehicle, comprising:
a floor;
a base coupled to the floor and having first and second vertical members extending from the base, wherein the first and second vertical members are coupled to a cross member;
first and second walls coupled to the base, wherein the first wall is coupled to a vehicle-forward edge portion of the base and the second wall is coupled to a lateral edge portion of the base;
a light source coupled to at least one of the first wall and the second wall; and
a first panel pivotally coupled to top portions of the first and second vertical members, respectively.

13. The vehicle of claim 12, further comprising:
a sensor coupled to at least one of the first wall, the second wall, and the base, wherein the sensor is configured to sense a presence of items positioned on the base.

14. The vehicle of claim 13, further comprising:
a controller in communication with the light source and the sensor, wherein the controller is configured to activate the light source to indicate that items are positioned on the base.

15. The vehicle of claim 13, wherein the sensor is at least one of an optical sensor, an infrared sensor, a force sensor, and a video image sensor.

16. The vehicle of claim 12, further comprising:
a retaining member coupled to a vehicle-rearward edge portion of the base.

17. The vehicle of claim 12, further comprising:
a removable floor positioned on the base and having a plurality of raised ribs extending from a portion of a surface of the removable floor, such that the removable floor comprises a first thickness and a second thickness.

\* \* \* \* \*